H. C. BABEL.
WHEEL RIM.
APPLICATION FILED JAN. 31, 1919.

1,374,272.

Patented Apr. 12, 1921.

INVENTOR
Henry Clay Babel
By
ATTORNEY

UNITED STATES PATENT OFFICE.

HENRY CLAY BABEL, OF BUFFALO, NEW YORK.

WHEEL-RIM.

1,374,272. Specification of Letters Patent. Patented Apr. 12, 1921.

Application filed January 31, 1919. Serial No. 274,215.

*To all whom it may concern:*

Be it known that I, HENRY CLAY BABEL, a citizen of the United States of America, residing in the city of Buffalo, in the county of Erie, State of New York, have invented certain new and useful Improvements in Wheel-Rims, of which the following is a full, clear, and exact description.

It is well known to those skilled in the art that automobile tires of the airless type, or semi-pneumatic type, are extremely difficult to place upon their rims, requiring the combined efforts of three or four men to get them in place, and it is almost impossible to get them off from the rims without practically destroying the tire. It is also difficult to place a pneumatic tire of the clencher type upon a rim or to remove it therefrom.

The principal object of my invention has been to provide a rim formed of two sections, so designed that the removable section may be easily and quickly detached, whereby the tire may be easily slid laterally and removed from the stationary section of the rim, thereby overcoming the difficulties above mentioned.

Another object has been to provide a single rim which shall have the advantages of the demountable rim, and at the same time save the material ordinarily used for a felly band; also to provide a rim which shall be inexpensive to manufacture and one simple and easy to handle.

Another object has been to provide suitable locking means for the detachable portion of the rim, whereby this section of the rim may be easily and quickly unlocked.

The above objects and advantages, as well as others which will be apparent to those skilled in the art, have been accomplished by the device shown in the accompanying drawings, in which.

Figure 1:
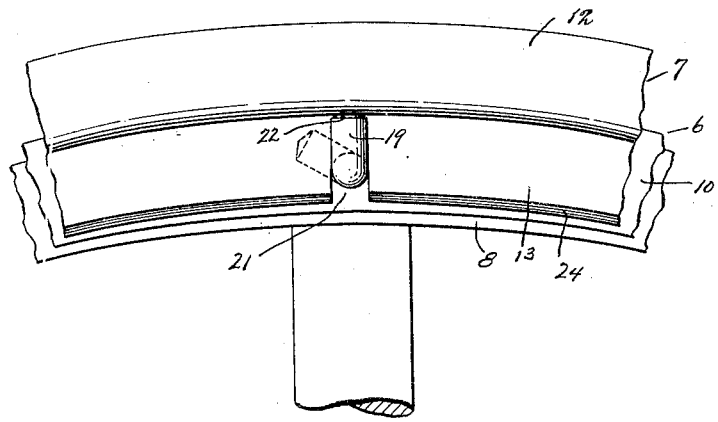
Figure 1 is a fragmentary side elevation of an automobile wheel with rim attached thereto, the angle head of the pivot-bolt being shown in its normal position and partly released as indicated in dotted lines.

In the drawings, 5 represents the sectional rim, which comprises a stationary member 6 and a detachable member 7. The stationary member 6 forms the major portion of the rim, and is secured to the felly 8 of the wheel by any suitable means. This portion of the rim is provided at one side with the tire flange 9, and at its opposite side with an inwardly extending flange 10. This flange 10 is bent preferably at right angles to the base 11 of the rim, and may, if desired, be also secured to the face of the felly 8 of the wheel.

The detachable member 7 of the rim is provided at its outer edge with a flange 12, similar to the flange 9 of the member 6, and at its opposite edge with an inwardly extending flange 13. The flange 13 is preferably bent at right angles to the base 14 of this portion of the rim, and is arranged, when in position, to fit against the flange 10 of the stationary portion of the rim.

Figure 2:
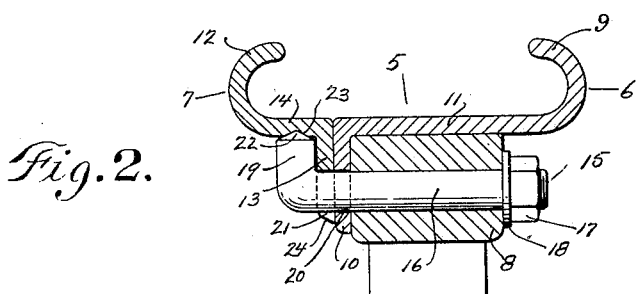
Fig. 2 is a sectional elevation of the same.
Figure 3:
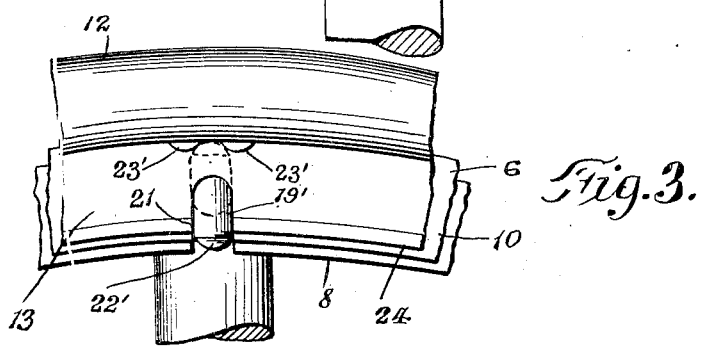
Fig. 3 is a similar view to Fig. 1 showing a modification in the construction of the means whereby the angle-head of a pivot-bolt is engaged with the base of the detachable member of the rim; the angle-head being shown in the position to which it is moved for releasing the detachable member from the stationary member of the rim and in normal position in dotted lines.

A plurality of fastening means 15 are provided for holding the detachable member 7 of the rim in position. These means may comprise a pivot bolt 16, having a nut 17 and a washer 18 at its inner end. The outer end of the pivot bolt, or the end which is arranged at the side of the rim where the detachable member is located, is bent over at right angles to the body of the pivot bolt, thus forming an angle head 19. These pivot-bolts are passed through suitable pivot-bolt apertures 20 formed in the inwardly extending flange 10 of the stationary member 6 of the rim, whereby the pivot-bolts are firmly supported and are furnished a suitable bearing in addition to the bearing provided by the wood of the felly 8 of the wheel. The detachable member 7 of the rim is provided with a plurality of radial bolt slots 21, equal in number to the number of pivot bolts provided and in registering position with the pivot-bolt apertures 20 formed in the flange 10. When the angle heads 19 of the pivot-bolts 16 are turned so that they project outwardly from the center of the wheel, (as shown in Figs. 1 and 2) it will be seen that the detachable member 7 of the rim will be firmly held in position. In order to retain the pivot-bolts in this position, I have provided a very simple and efficient locking means. The extreme end 22 of the angle heads 19 of each pivot-bolt is made conical (as shown in Figs. 1 and 2) or semi-spherical in form (as shown in Fig. 3). In the underside of the base 14 of the detachable member 7 of the rim is formed a plurality of indentations 23, (as shown in Fig. 2) equal in number to the number of radial bolt slots 21 and arranged radially adjacent to the said radial bolt slots. The length of the angle heads 19 of the pivot-bolts is such that the ends 22 thereof will spring into and be lockingly engaged with the indentations 23 when the pivot-bolts are moved to the position shown by the full lines in Fig. 2 of the drawings.

From the foregoing it will be seen that fastening means 15 will hold the detachable member 7 of the rim firmly against the stationary member 6 thereof, irrespective of whether the tire is expanded against the flanges thereof or not. This is a very valuable feature in my rim, as the locking means cannot be affected by the condition of the tire upon the rim.

When it is desired to remove the tire it is only necessary to spring the ends of the angle-heads 19 out of their engaging recesses 23 and to turn the pivot-bolts half way around, or to a position where the angle-heads of the pivot-bolts will lie over the radial bolt slots 21 in the flange 13 (as shown in Fig. 3). In this position the detachable member 7 is immediately disengaged from the wheel and the tire may then be slid laterally from the stationary member 6 of the rim.

When a tire is to be placed upon the rim, it is first slid along on the base 11 of the stationary member 6, whereupon the detachable member 7 is placed in contact with the outer edge of the tire. The detachable member is then pressed firmly against the stationary member, and the pivot bolts 16 are given a half turn and moved to the position shown in Figs. 1 and 2 of the drawings. In rotating the angle heads, it will be seen that the rounded inner side thereof will engage with the chamfered edge 24 of the flange 13 and serve to force the detachable member 11 inwardly into position, thus greatly facilitating the compression of an airless or semi-pneumatic tire when being placed upon the rim.

While I have shown in the drawings a rim of the clencher type, it is obvious that the same may be used with equal efficiency in connection with tires of the straight side type. Furthermore, my invention is adapted for use in connection with wire wheels as well as with the wooden wheel shown in the drawings. Instead of the indentations in the underside of the detachable member, I may provide lugs 23′ which are engaged with the semi-spherical end 22′ of the angle or L-shaped head 19′ as shown in dotted lines in Fig. 3.

These and other modifications of the details herein shown and described may be made without departing from the spirit of my invention or the scope of the appended claims; and I do not, therefore, wish to be limited to the exact embodiment herein shown and described.

Having described my invention, what I claim is:

1. A wheel rim comprising a stationary member, a detachable member, and fastening means for the detachable member comprising a plurality of pivot-bolts, each having an L-shaped head, the underside of the detachable member being provided with means for effecting a springing engagement with the ends of the L-shaped heads, whereby they are locked in place.

2. A wheel rim comprising a stationary member, a detachable member, and fastening means for the detachable member comprising a plurality of bolts, each having an L-shaped head, the underside of the detachable member being provided with indentations with which the bolt heads are arranged to have a springing engagement.

3. A wheel rim comprising a stationary member, a detachable member, said members having inwardly extending flanges arranged adjacent to each other, the flange of the stationary member being formed with a plurality of apertures, and the flange of the detachable member being formed with a plurality of slots, and a plurality of fastening means, each comprising a bolt passing through one of the registering slots and apertures of the flanges, each of said bolts having an L-shaped head engageable with an indentation formed on the underside of the base of the detachable member, whereby the bolts are lockingly held against turning.

In testimony whereof, I have hereunto signed my name.

HENRY CLAY BABEL.